United States Patent [19]

Pearne et al.

[11] 3,893,575
[45] July 8, 1975

[54] BRICK HANDLING SYSTEM

[75] Inventors: Frank S. Pearne, San Gabriel; Florentin J. Pearne; William P. Osborn, both of Whittier; Joseph A. Guzzetta, Costa Mesa, all of Calif.

[73] Assignee: Aircraft Mechanics, Inc., Downey, Calif.

[22] Filed: Oct. 15, 1973

[21] Appl. No.: 406,579

[52] U.S. Cl. .......................... 214/8.5 C; 214/1 BB
[51] Int. Cl. .......................................... B65g 59/02
[58] Field of Search .... 214/1 BB, 6 A, 8.5 C, 1 BC, 214/1 BT, 1 BH, 1 BV, 152

[56] References Cited
UNITED STATES PATENTS

| | | | |
|---|---|---|---|
| 3,669,283 | 6/1972 | Brown | 214/8.5 C |
| 3,776,398 | 12/1973 | Stuart | 214/8.5 C |

*Primary Examiner*—Robert B. Reeves
*Assistant Examiner*—Larry H. Martin
*Attorney, Agent, or Firm*—McNenny, Farrington, Pearne & Gordon

[57] ABSTRACT

A brick handling system is disclosed for automatically unloading kiln cars or the like and for supplying the unloaded bricks to a subsequent processing operation in a uniform manner. The unloader is operable to unload kiln cars provided with a plurality of stacks of grids containing rows of bricks extending perpendicular to the rows in the adjacent grids above and below in each stack. A gripper transfer is operable to grip entire grids in a single operation or to grip partial grids, as the case may be. In one orientation, the gripper grips groups of bricks from a plurality of stacks along the entire length of the kiln car, and in another orientation, operates to grip groups of bricks from a plurality of stacks across the entire kiln car. The bricks removed from the kiln car are marshaled on a receiving platform at two different locations and are subsequently transferred to a conveyor in lateral rows or ranks each containing a predetermined number of bricks therein.

16 Claims, 7 Drawing Figures

BRICK HANDLING SYSTEM

BACKGROUND OF THE INVENTION

This invention relates generally to automated brick handling equipment and more particularly to a novel and improved automated system particularly adapted for unloading bricks from kiln cars or the like and for supplying them to subsequent processing equipment in a uniform manner.

PRIOR ART

Various systems have been developed to reduce the labor involved in the manufacture of bricks or the like. Examples of such machines and systems are illustrated in the United States letters Patents, Numbers 3,487,959; 3,601,266; and 3,656,634. In the prior art systems, difficulty is encountered in attempting to unload stacks of grids from kiln cars wherein the stacks of grids do not contain the same number of bricks in corresponding lateral or longitudinal rows. Also, most prior art unloaders cannot simultaneously grip and remove bricks from the entire length or width of a kiln car loaded with dissimilar stacks of bricks.

SUMMARY OF THE INVENTION

The present invention is directed to an automated system which is flexible in that it can be used to unload stacks of bricks from a kiln car or the like wherein the stacks may not be similar. Further, the system can be used to unload stacks wherein an entire grid need not be removed from a kiln car in each unloading operation. Further, the system can simultaneously grip and remove bricks from the entire length and width of a kiln car.

For purposes of this disclosure and the claims, the lateral rows of bricks positioned on the conveyor are referred to as ranks, and the longitudinal rows of bricks on the conveyor are referred to as files. In the illustrated embodiment, the ranks consist of lateral rows of side abutting bricks, and the files consist of lengthwise aligned abutting bricks. It should be understood, however, that it is within the scope of the present invention to provide a pattern of bricks on the conveyor in which the lateral rows on the conveyor, or ranks, consist of lengthwise aligned bricks, and the files consist of bricks which are abutting along their sides.

An automated system in accordance with the present invention is particularly suited for unloading kiln cars or the like and for transferring bricks to a subsequent processing operation in a uniform manner even when the pattern of bricks on the kiln car is not uniform. In the preferred embodiment of this invention, a transfer is operable to sequentially remove groups of bricks from a kiln car wherein the number of bricks in either the lengthwise or lateral rows of one grid differs from the numbers of bricks in either the longitudinal or lateral row of another grid. The transfer operates to position groups of bricks having a predetermined number of bricks in files at one location and to deposit groups of bricks having a different predetermined number of bricks in its files at a second location. Subsequently, the bricks are moved from the support platform to a conveyor with a predetermined number of bricks in each rank of bricks positioned on the conveyor. The conveyor then moves the bricks to a subsequent operation or a processing system in a uniform column in which the bricks are contained in ranks having a predetermined number of bricks therein.

DETAILED DESCRIPTION OF THE DRAWINGS

Figure 1:
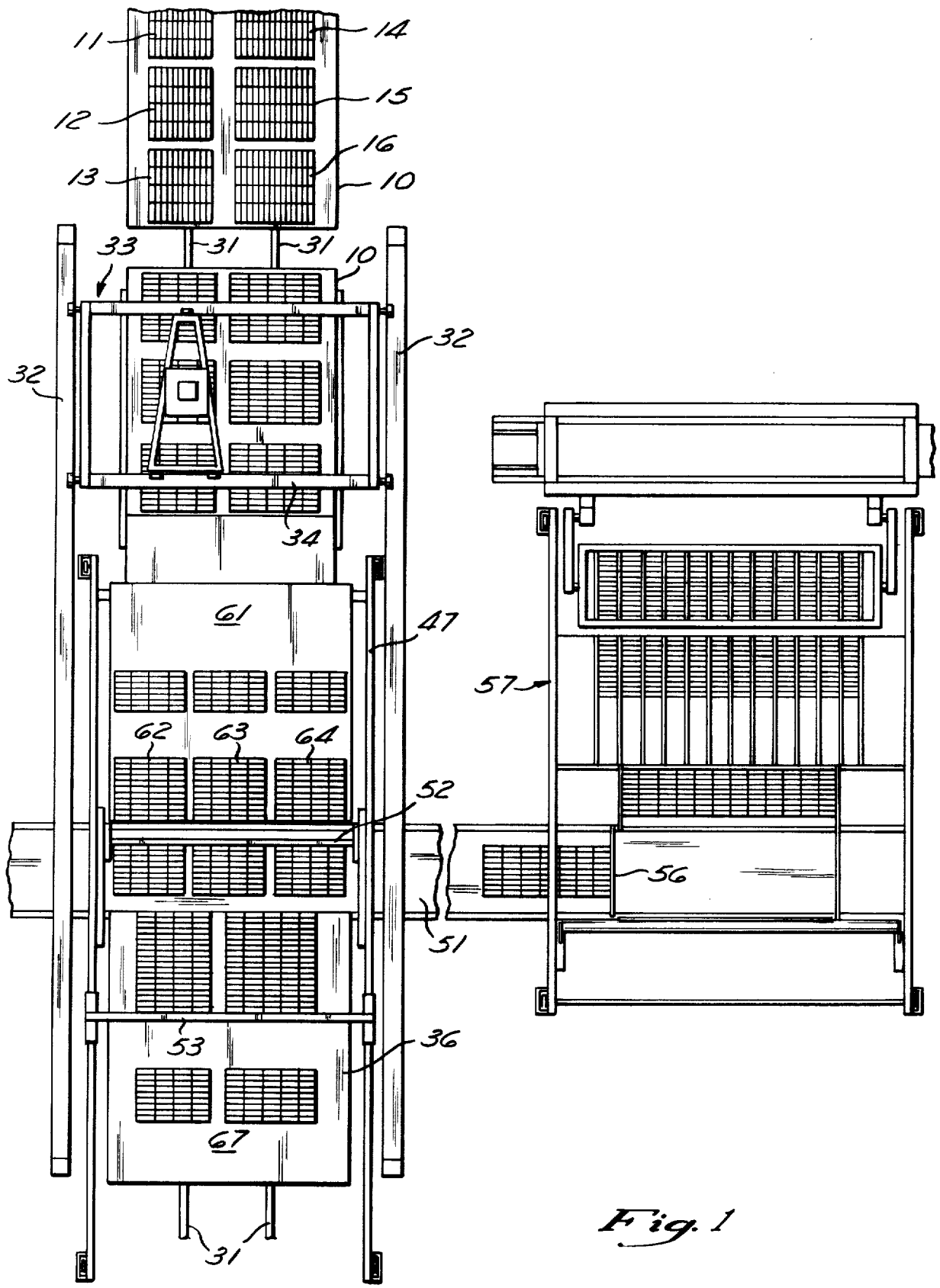
FIG. 1 is a plan view schematically illustrating an unloading system in accordance with the present invention arranged to supply an automated stacker.
Figure 2:
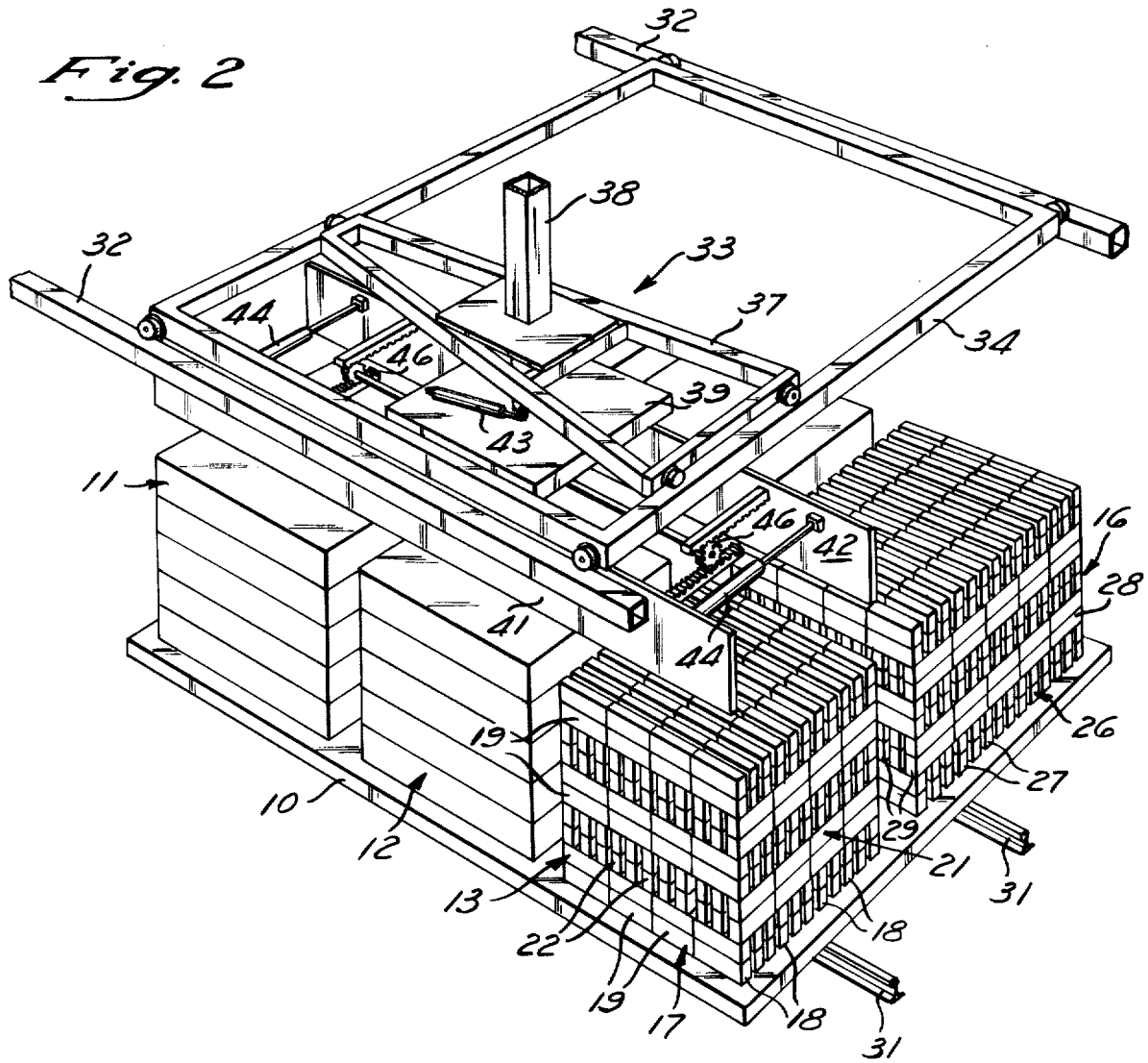
FIG. 2 is a perspective view illustrating the gripper transfer which operates to grip the bricks located on the kiln car and remove the bricks therefrom.

Referring to FIGS. 1 and 2, the bricks are delivered or supplied to the system in stacks carried by kiln cars 10. In the illustrated embodiment, there are six separate stacks 11, 12, 13, 14, 15, and 16 on each kiln car 10. The stacks are arranged with three similar stacks 11 through 13 aligned along one side of the kiln car and three similar stacks 14 through 16 located along the opposite side of the kiln car. Laterally the stacks 11 and 14 are aligned with each other as are the stacks 12 and 15, and 13 and 16, respectively. Each of the stacks consist of a plurality of grids as best illustrated in FIG. 2 by the full illustration of the stack 13. The bottommost grid 17 of the stack 13 provides lengthwise abutting aligned rows 18 each consisting of four pairs of lengthwise abutting bricks arranged in an upper and lower layer. In this grid there are eleven lengthwise rows which are spaced from each other to provide air passages for uniform firing of the bricks. The lateral rows 19 therefore consist of 11 aligned pairs of bricks, again with each row formed of an upper and lower layer.

The grid 21 is positioned immediately above the grid 17 but is positioned with the bricks oriented at 90° with respect to the bricks on the grid 17 so that the lengthwise rows 22 (rows which contain abutting lengthwise aligned bricks) extend laterally with respect to the car 10. In this instance, each of the lengthwise rows 22 of the bricks in the grid 21 also contains four pairs of bricks, and there are again 11 laterally spaced lengthwise rows in the grid. Therefore, in this stack, the grids each contain the same number of lengthwise and lateral rows and the stack 13 is symmetrical. In this particular illustrated embodiment, the same is true of the stacks 11 and 12 since they are similar to the stacks 13.

The stack 16, however, consists of grids which do not have the same number of lengthwise and lateral rows. The lower grid 26 of the stack 16 consists of lengthwise rows 27 each containing four pairs of bricks in two layers, but the grid 26 contains 14 lengthwise rows whereas the lowermost grid of the stack 13 contains only 11 lengthwise rows. The grid 28 consists of lengthwise row each containing five pairs of bricks arranged in double layers. However, this grid contains 11 lengthwise rows 29. Consequently, the stack 16 is not symmetrical, but is rectangular. The grid positioned above the grid 28 is similar to the grid 26 and so on with each grid containing bricks extending perpendicular to the bricks of the grid above and below. In the illustrated embodiment, the stacks 14, 15, and 16 are all the same in size and arrangement.

In the illustrated system, the kiln cars are delivered to the machine along rails 31. Extending parallel to the rails 31 is support frame 32 along which a gripper transfer assembly 33 is movable. The gripper transfer assembly 33 includes a carriage 34 supported by rollers for movement along the frame 32 from a position over the kiln cars 10 at the unloading station to a position over a table 36. Supported by the carriage 33 is a secondary carriage 37 which is supported by rollers and is laterally movable with respect to the carriage 34. A vertically movable column 38 is carried by the secondary carriage 37 and supports at its lower end a support plate 39 on which a pair of opposed gripper plates 41 and 42 are mounted.

The support plate 39 can be turned with respect to the column 38 through 90° by an actuator 43. In one position, the gripper plates 41 and 42 are aligned with the lengthwise direction of the kiln cars, and in its other position they extend laterally or perpendicular to the lengthwise direction of the kiln car. The gripper plates 41 and 42 are movable toward each other and apart by a pair of actuators 44, and a rack and pinion mechanism 46 is provided to maintain the grippers parallel to each other and to insure that they both move in a similiar manner with respect to the central axis of the column 38.

Suitable power actuators are provided to control the position of main carriage 34 with respect to the frame 32 and to control the position of the secondary carriage 37 with respect to the main carriage 34. Further, suitable actuators are connected to control the vertical position of the support plate 39, and in turn the gripper plates 41 and 42 with respect to the secondary carriage. Reference may be made to U.S. Pat. No. 3,487,959 for a more detailed description of one form of actuator arrangement which may be used to control the operation of the gripper. It should be understood that the actuators can be either hydraulic, pneumatic or electric and may include piston and cylinder actuators as well as motor driven chain drives or the like.

Figure 3:
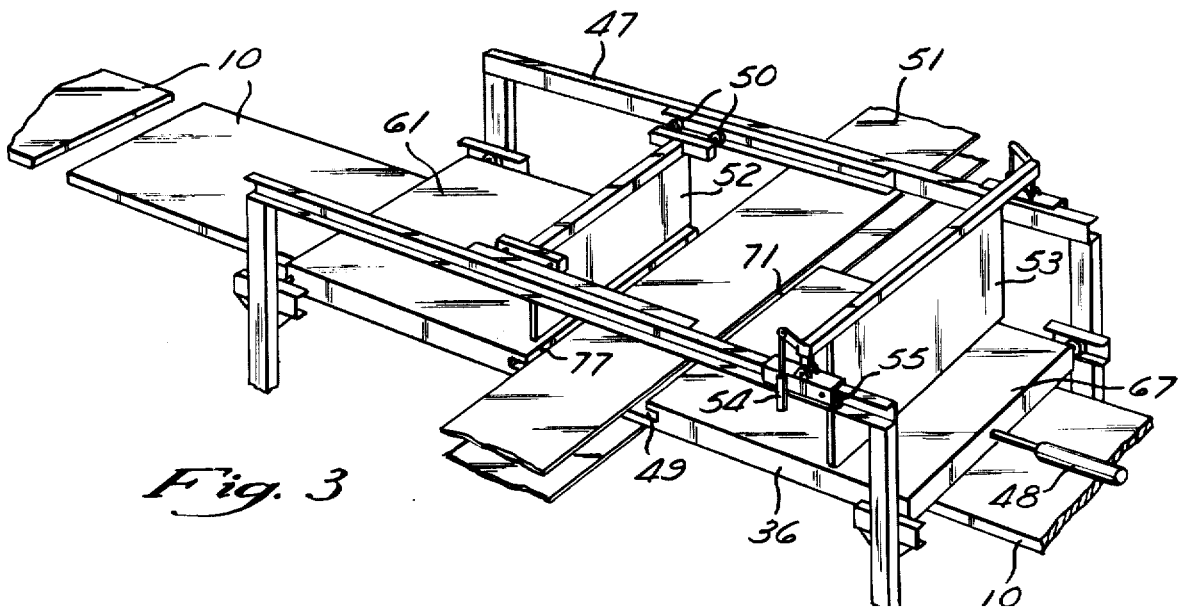
FIG. 3 is a fragmentary perspective view illustrating the support platform on which the bricks unloaded from the kiln car are marshaled and supplied to a conveyor which transports the bricks to the subsequent processing operation.

Referring to FIG. 3, the support table 36 is supported by a secondary frame 47 for limited longitudinal movement controlled by an actuator 48. The support table or platform is provided with a cutout section 49 along which the upper reach of the belt conveyor 51 extends. The movement of the platform with respect to the conveyor 51 is described in greater detail below. Positioned above the support platform 36 is a retainer plate 52 which is supported by rollers 50 for movement with respect to the frame 47 back and forth across the conveyor 51. Also supported on the frame 47 by rollers 55 is a pusher plate 53 which is movable back and forth along the support platform 36. The pusher plate is pivoted at 60 so that it can be raised by actuators 54 to pass over the retainer plate 52. Here again, the actuators for controlling the movement of the pusher plate 53, back and forth along the table 36, and the movement of the retainer plate 36, back and forth across the conveyor 51, are not illustrated but are preferably chain-connected motors supported by the frame 47.

Referring to FIG. 1, the conveyor 51 is operable to carry bricks from the receiving station at the support platform 36 to a subsequent processing operation. In the illustrated embodiment, the conveyor carries the bricks to a gate 56 beyond which they are supplied to a stacker system which functions to automatically from stacks of bricks for packaging and shipment. The stacker assembly 57 illustrated forms no part of the present invention, excepting that it illustrates one processing system which can be supplied with bricks by an unloader in accordance with the present invention.

In operation, a kiln car 10 is moved to the unloading station illustrated in FIG. 1 below the gripping position of the gripper transfer. The gripper transfer is moved over the kiln car and is properly positioned so that the gripper plates 41 and 42 can be lowered down for gripping of the uppermost grids. In FIG. 2, the gripper is illustrated in position so that the gripper plates 41 and 42 can be lowered down along the opposite sides of the uppermost grid on the three stacks 11, 12 and 13. The gripper plates are then pulled together or toward each other causing the spaced longitudinal rows of bricks in each stack to slide laterally until they are in abutting engagement. The gripper plates 41 and 42 then operate along the entire length of the kiln car to grip the entire upper grid from each of the stacks 11, 12, and 13.

The gripper plates with gripped grids carried thereby are then raised and the carriage 34 is moved to a position over one side 61 of the support table 36. During such movement, the secondary carriage 37 is centered with respect to the main carriage 34, and the support 39 is rotated through 90° so that the lengthwise dimension of the bricks extends across the table in files which are parallel to the conveyor 51. The support 39 is then lowered to position the three grids at the position 62, 63, and 64 illustrated in FIG. 1. The grippers are then opened to release the bricks and are raised clear of the grids resting on the table.

The gripper assembly is then returned to a position over the car where it is operated to subsequently grip and remove the top grids from the stacks 14, 15, and 16. In this instance where there are more lengthwise rows in the uppermost grids aligned with the length of the kiln car than there are in the stacks 11, 12, and 13, the gripper is preferably operated to grip and remove in a given cycle only about half of the lengthwise rows in the uppermost grids of the stack. Consequently, the gripper plate 42 is positioned to extend down between two of the lengthwise rows on the stacks 14, 15, and 16, while the other gripper plate 41 is positioned beside the grid. Thus, it is apparent that the gripper can be used to remove less than an entire grid during one cycle if the grids are relatively large, but it can be used to grip and remove an entire grid if the grids are not too large for reliable gripping and transport.

After gripping, for example seven lengthwise rows of bricks from the stacks 14, 15, and 16, the gripper assembly proceeds to transport the bricks to a position over the side 61 of the platform. During a third cycle of operation, the remaining rows of bricks are removed from the grids on the stacks 14, 15, and 16 and are positioned on the side 61 of the platform. The platform is sized to receive all of the bricks from one layer of grids on one side while the bricks from the other side of the platform are moved to the conveyor 51.

After all of the uppermost layers of lengthwise grids are removed from the kiln car, the topmost layer of grids in each stack include lengthwise rows which extend laterally across the kiln cars. These are substantially removed by lowering the gripper plates 41 and 42, while they have been rotated through 90° from the position illustrated in FIG. 2, so that they grip the entire grids or partial grids, as the case may be. For example, the grippers can be operated in the illustrated embodiment to grip and remove the uppermost grids of each of the stacks 13 and 16 by a simultaneous gripping movement. After these stacks are gripped, the gripper assembly is moved to a position over the side 67 of the platform on the opposite side of the conveyor 51. On a subsequent operation, the gripper removes the uppermost grids from the stacks 12 and 15 after which the corresponding grids are removed from the stacks 11 and 14. In each instance, the bricks of the corresponding grids are positioned on the platform 36 on the side 67.

It should be noted that all of the grids located on the side 67 include one group of bricks including four aligned bricks in a file (aligned with the direction of the conveyor 51) and another group of bricks containing five aligned bricks in each file. The ranks in each group are aligned. On the side 61 of the platform, there are three groups of bricks each containing files with four aligned bricks and again the ranks are aligned with each other.

Figure 4:
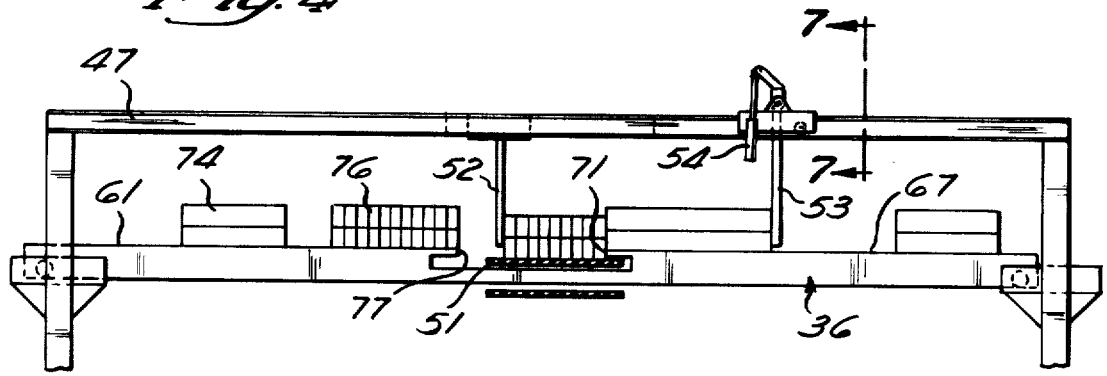
FIG. 4 is a schematic side elevation illustrating the operation of moving the bricks from the support or marshaling platform to the conveyor illustrating the apparatus immediately after one group of bricks have been moved from one side of the platform and positioned on the conveyor.

Reference should not be made to FIGS. 3 through 6 which illustrate the operation of moving the bricks from the table 36 to the conveyor belt 51. When it is desired to move bricks from the side 67 of the table 36, the table is moved to the left as illustrated in FIG. 4 until the right-hand edge 71 projects over the belt conveyor 51, as illustrated. The retainer plate 52 is positioned with respect to the belt to limit movement of the bricks onto the belt so that the proper number of bricks will be provided in each rank between the retainer plate 52 and the edge 71 of the table 36, and so that the bricks will be centered on the belt. The pusher plate 53 is lowered behind a group of bricks located on the side 67 and is moved to the left as viewed in FIG. 4 to push bricks along the table 36 and onto the belt conveyor 51 until the forwardmost group of bricks engages the retainer 52. When the proper number of bricks in each rank is located on the belt conveyor 51, the retainer prevents further movement and a condition exists as illustrated in FIG. 4. In the illustrated embodiment, this occurs when each rank includes nine pairs of brick in two layers with one resting on the other. During such movement of the bricks onto the conveyor, the conveyor remains stationary. The table 36 is then moved to the right so that a clearance exists between the forward row 72 of the bricks resting on the side 67 and the retainer plate 52 is moved clear of the bricks. This is a condition illustrated in FIG. 5. The conveyor is then operated to carry the group of bricks 73 away from the table. If more bricks are to be moved from the side 67, the platform 36 is moved again to the left to the position illustrated in FIG. 4, and the retainer is properly positioned as illustrated in FIG. 4 to allow the pusher 53 to load a subsequent group of bricks having nine bricks in each rank onto the conveyor.

Figure 5:
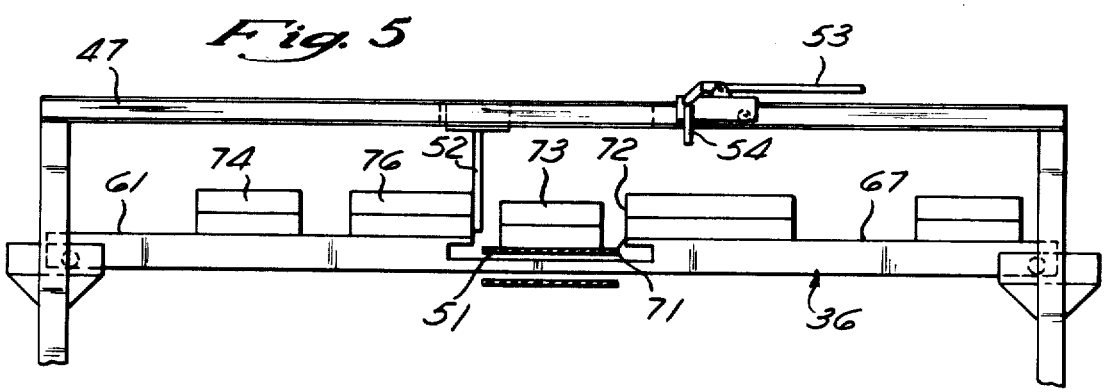
FIG. 5 is a schematic side elevation similar to FIG. 4, but illustrating the positions of the elements assume during an intermediate phase of the operation.
Figure 6:
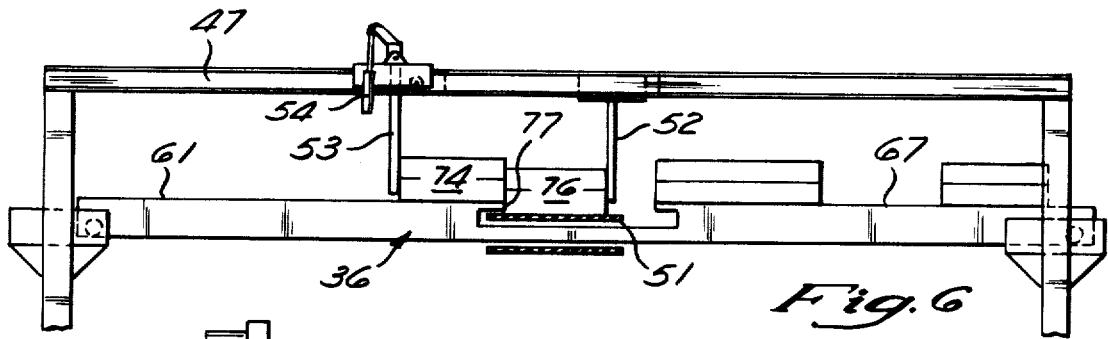
FIG. 6 is a schematic side elevation similar to FIGS. 4 and 5, but illustrating the positions of the elements immediately after bricks have been positioned on the conveyor from the opposite side of the platform.
Figure 7:
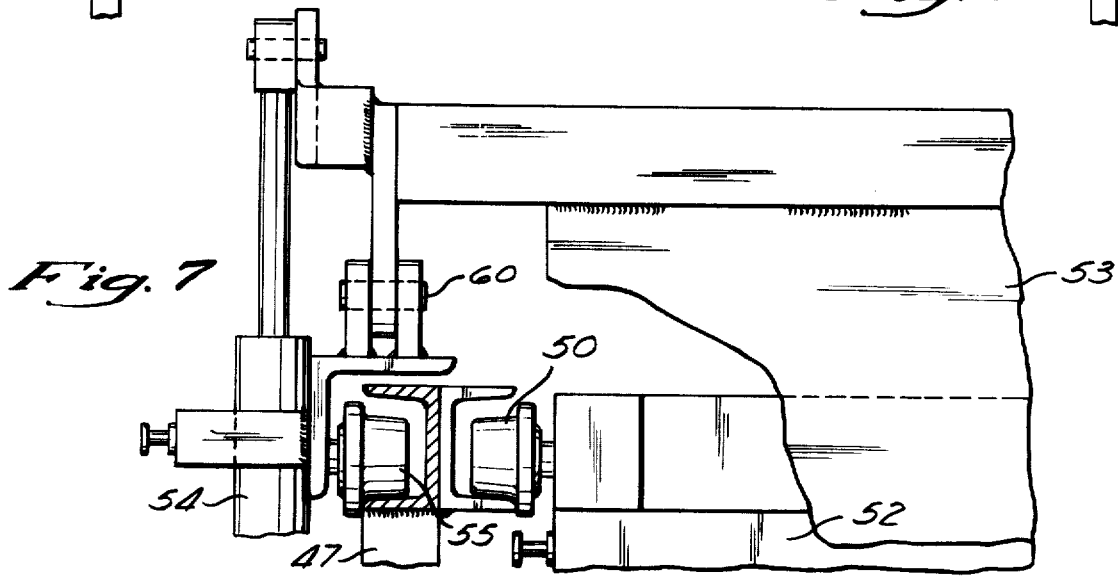
FIG. 7 is an enlarged fragmentary section taken generally along 7—7 of FIG. 4 illustrating the support for the pusher and for the retainer.

Alternatively, the pusher 53 can be raised as indicated in FIG. 5 and moved over to the left beyond the group of bricks located at 74 and lowered behind such group. Since the group previously loaded on the conveyor is carried away by the conveyor, the conveyor is clear to allow the retainer plate 52 to move across the conveyor to the position shown in FIG. 6. The pusher 53 first operates to push the group 74 over against the group 76 and thereafter causes at least part of the group 76 to be moved onto the conveyor as illustrated in FIG. 6. Here again, the positioning of the table is arranged so that the edge 77 is located inward from the adjacent edge of the conveyor, and the retainer plate 52 is positioned to insure that nine bricks will be present in each rank located on the conveyor. The retainer plate 52 is then moved clear of the bricks 76 on the conveyor, and the table is centered to allow the conveyor to carry the group of bricks 76 out of the receiving station. Subsequently, the table can be returned to the loading position of FIG. 6, and the retainer plate 52 can be properly positioned to allow loading of at least part of the bricks of the group 74 onto the conveyor. So long as the number of bricks located on either one or the other sides of the table is at least equal to the number of bricks required in each rank, the machine is capable of moving groups of bricks having the desired predetermined number of bricks in each rank onto the conveyor.

The conveyor functions to transport the separate groups to the subsequent operation and consolidates the groups in a column against the retainer fence 56 so that a continuous column of bricks is provided in which each rank contains the desired predetermined number of bricks (nine in the illustrated embodiment) and the files are properly aligned.

It should be recognized that greater flexibility is provided by the present unloader since the unloader can be utilized to unload stacks which are not uniform in size and which can contain lateral or longitudinal rows which differ in number between stacks. Further, since the gripper operates to simultaneously grip aligned rows along the entire length or width of the kiln car, large numbers of brick are gripped and transferred during each cycle of the gripper transfer. Since all of the groups of bricks deposited on the side 67 of the table contain similar numbers of bricks in each file, it is possible to operate the pusher to move bricks onto the conveyor with a predetermined number of bricks in each rank without encountering difficulty. Similarly, because all of the groups of bricks located on the side 61 of the table contain the same numbers of bricks in each file (even though the number differs from the number on the side 67) it is possible to again move the same number of bricks in each rank onto the conveyor without difficulty. With the present invention, it is therefore possible to rapidly unload kiln cars which are not symmetrically loaded without difficulty and to remove either entire or partial grids in each gripper transfer operation.

Although a preferred embodiment of this invention is illustrated, it should be understood that various modifications and rearrangements of parts may be resorted to without departing from the scope of the invention disclosed and claimed herein.

What is claimed is:

1. A handling system for unloading elongated kiln cars or the like when said cars are loaded with a plurality of stacks of bricks in grids stacked on each other and having rows of bricks therein extending normal to the rows of bricks in the adjacent grids in each stack and wherein the number of stacks along the length of the car differs from the number of stacks across the width of the car comprising support means, a gripper transfer operable in a first orientation to simultaneously grip groups of aligned rows of bricks along the entire length of said kiln car and to position said bricks in ranks and files at a first location on said support means, said gripper transfer being operable in a second orientation to simultaneously grip groups of aligned rows of bricks across the entire width of said car and to position said bricks in ranks and files on said support means at a second location, transport means operable to receive rank files of bricks from both said first and second locations and to transport such bricks to a delivery position, and transfer means operable to move ranks and files of bricks from said first and second locations to said transport means in ranks having a predetermined number of bricks therein.

2. A handling system as set forth in claim 1 wherein said transport means is an elongated conveyor, and said support means and transfer means cooperate to center the ranks of bricks on said conveyor.

3. A handling system as set forth in claim 2 wherein said support means is provided with an edge across which bricks move from said support means to said conveyor, said conveyor and said edge being movable relative to each other to provide clearance between bricks on said conveyor and bricks on said support means.

4. A handling system as set forth in claim 3 wherein said transfer means includes a movable restrainer member which cooperates with said edge to insure that the ranks of bricks on said conveyor contain said predetermined number of bricks therein.

5. A handling system as set forth in claim 4 wherein said restrainer member is retractable to provide clearance with respect to bricks on said conveyor.

6. A handling system as set forth in claim 5 wherein said conveyor extends between said first and second locations.

7. A handling system as set forth in claim 2 wherein said transfer means positions bricks on said conveyor in separate groups, and said conveyor operates to consolidate said groups in a column containing files of abutting bricks.

8. A handling system as set forth in claim 1 wherein said stacks are loaded so that the bricks positioned at said first location are in files having a second predetermined number of bricks therein and the bricks positioned at said second location are in files having a third predetermined number of bricks therein.

9. A handling system for bricks or the like comprising transport means operable to receive ranks and files of bricks at a receiving station and to transport said bricks to a delivery station, support means at said receiving station for receiving at a first location a first group of bricks in ranks and files with each file containing a first predetermined number of bricks and for receiving at a second location a second group of bricks in ranks and files with each file containing a second predetermined number of bricks, different than said first predetermined number of bricks, first transfer means operable to position first groups of bricks on said support means at said first location with each file containing said first predetermined number of bricks and second groups of bricks on said support means at said second location, with each file containing said second predetermined number of bricks and second transfer means operable to move ranks of bricks having a third predetermined number of bricks therein from both said first and second locations to said transport means.

10. A handling system as set forth in claim 9 wherein said first transfer is a gripper transfer operable to simultaneously grip said first and second groups for movement to said support means, and at least one of said first and second groups contains ranks having a number of bricks therein different than said third predetermined number.

11. A handling system as set forth in claim 10 wherein said support means is a platform, said transport means is an elongated conveyor extending between said first and second locations; and said platform is movable substantially perpendicular to the length of said conveyor.

12. A handling system as set forth in claim 11 wherein said conveyor operates to consolidate bricks in a column containing abutting files of bricks.

13. A handling system for supplying bricks to a processing station in ranks having a first predetermined number of aligned bricks and aligned files comprising a source of bricks positioned in grids of laterally and longitudinally aligned rows wherein similar first grids contain a number of bricks in either a lateral or longitudinal row which differs from the number of bricks in similar second grids in either their lateral or longitudinal rows, transport means operable to receive bricks at a receiving station in ranks and files and to move said ranks and files from said receiving station, support means at said receiving station, first transfer means operable to sequentially position first grids from said source on said support means at a first location in ranks and files with a second predetermined number of bricks in each file and to position second grids on said support means in a second location in ranks and files with a third predetermined number of bricks in each file, said third predetermined number of bricks being different than said second predetermined number of bricks and third transfer means operable to move ranks of said first predetermined number from both said first and second locations to said first transfer means.

14. A handling system as set forth in claim 13 wherein said source includes a kiln car with a plurality of stacks of grids thereon, and said first transfer means includes a gripper operable in a first orientation to simultaneously grip rows of aligned bricks from a plurality of stacks along the entire length of the kiln car and operable in a second orientation to simultaneously grip rows of aligned bricks from a plurality of stacks across the entire width of said kiln car.

15. A brick handling system comprising a supply of bricks positioned on a kiln car in a plurality of stacks with each stack formed of grids having rows of bricks extending normal to the rows in adjacent grids, a conveyor operable to receive ranks and files of bricks at a receiving station and to transport said ranks and files to a delivery station, a support platform at said receiving station, a gripper transfer operable in one orientation to simultaneously grip a plurality of rows of bricks from a plurality of stacks along the entire length of said kiln car or the like and to deliver such bricks to said support platform at a first location in ranks and files, said gripper transfer being operable in a second orientation to simultaneously grip a plurality of rows of bricks from a plurality of stacks across the entire width of said kiln car and to deliver such bricks to said support platform at a second location in ranks and files, and pusher means operable to transfer ranks and files of bricks from both said first and second locations to said conveyor in ranks having a predetermined number of bricks therein.

16. A brick handling system as set forth in claim 15 wherein the files at said first location contain a second predetermined number of bricks and the file at said second location contain a third predetermined number of bricks, and said conveyor operates to consolidate a column of bricks having files of abutting bricks therein.

* * * * *

UNITED STATES PATENT OFFICE
CERTIFICATE OF CORRECTION

PATENT NO. : 3,893,575
DATED : July 8, 1975
INVENTOR(S) : Frank S. Pearne, Florentin J. Pearne, William P. Osborn, Joseph A. Guzzetta It is certified that error appears in the above-identified patent and that said Letters Patent are hereby corrected as shown below:

Column 3, line 8, "row" should read -- rows --.

Column 4, line 15, "from" should read -- form --.

Column 5, line 11, "substantially" should read -- subsequently --.

Column 5, line 37, "not" should read -- now --.

Column 7, line 21, after "receive", "rank files" should read -- ranks and files --.

Signed and Sealed this eighth Day of June 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,893,575　　　　　　　　　　Dated July 8, 1975

Inventor(s) Frank S. Pearne et al.

It is certified that error appears in the above-identified patent and that said Letters Patent are hereby corrected as shown below:

Column 8, line 49, "third" should read -- second --.

Column 8, line 51, "first transfer" should read -- transport --.

Signed and Sealed this

Tenth Day of August 1976

[SEAL]

Attest:

RUTH C. MASON
Attesting Officer

C. MARSHALL DANN
Commissioner of Patents and Trademarks